United States Patent
Hofmeister et al.

(10) Patent No.: US 9,181,891 B2
(45) Date of Patent: Nov. 10, 2015

(54) METHOD AND DEVICE FOR IDENTIFYING ERRORS IN EMISSION-RELEVANT CONTROL DEVICES IN A VEHICLE

(75) Inventors: Carl-Eike Hofmeister, Regensburg (DE); Michael Käsbauer, Neutraubling (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 870 days.

(21) Appl. No.: 12/743,250

(22) PCT Filed: Nov. 11, 2008

(86) PCT No.: PCT/EP2008/065271
§ 371 (c)(1),
(2), (4) Date: Jul. 19, 2010

(87) PCT Pub. No.: WO2009/068431
PCT Pub. Date: Jun. 4, 2009

(65) Prior Publication Data
US 2010/0305811 A1    Dec. 2, 2010

(30) Foreign Application Priority Data
Nov. 28, 2007 (DE) .......................... 10 2007 057 311

(51) Int. Cl.
*F02D 41/22* (2006.01)

(52) U.S. Cl.
CPC .............. *F02D 41/221* (2013.01); *F02D 41/22* (2013.01); *F02D 2041/224* (2013.01); *F02D 2041/228* (2013.01); *F02D 2200/0614* (2013.01); *Y02T 10/40* (2013.01)

(58) Field of Classification Search
CPC ............ F02D 41/22–41/224; F02D 2041/224; F02D 2041/228; Y02T 10/40
USPC .............. 701/36, 29.1–29.2, 31.6, 31.8, 32.7, 701/33.5, 34.3–34.4; 73/114.01–114.02, 73/114.06, 114.31–114.32, 73/114.69–114.76; 123/568.11, 568.16, 123/568.21
See application file for complete search history.

(56) References Cited

U.S. PATENT DOCUMENTS

| | | | |
|---|---|---|---|
| 4,705,000 A | 11/1987 | Matsumura et al. | 123/357 |
| 4,881,505 A | 11/1989 | Tomisawa | 123/480 |

(Continued)

FOREIGN PATENT DOCUMENTS

| | | | | |
|---|---|---|---|---|
| DE | 3835766 | 5/1989 | | F02D 41/14 |
| DE | 4040927 | 6/1992 | | G06F 11/22 |

(Continued)

OTHER PUBLICATIONS

German Office Action for Application No. 10 2007 057 311.3 (3 pages), Jul. 31, 2008.

(Continued)

*Primary Examiner* — John Q Nguyen
*Assistant Examiner* — Michael Ng
(74) *Attorney, Agent, or Firm* — Slayden Grubert Beard PLLC

(57) ABSTRACT

A method and a device for identifying errors in emission-relevant control devices of a vehicle, such as the injection of fuel into a cylinder, allows error identification even if none of the sub-systems exceeds a predetermined threshold value. The method has the following steps: determining whether at least one parameter, which permits conclusions to be drawn about the emission behavior of the respective control device, lies in a desired range; if the parameter lies outside said desired range, an error value that correlates to an increase in emissions is stored; if the parameter is in the desired range, an error value of zero is stored; a total error value is formed from all error values of the control device and an error message is output if the total error value exceeds a predetermined threshold value.

19 Claims, 3 Drawing Sheets

If (measured fuel quantity MF > MF_Max) or (measured fuel quantity MF < MF_Min), then Y(X) = fault value (measured fuel quantity MF-MF_setpoint value) otherwise Y(X) = 0

(56) References Cited

U.S. PATENT DOCUMENTS

| | | | |
|---|---|---|---|
| 5,539,638 A * | 7/1996 | Keeler et al. | 701/32.9 |
| 5,572,424 A * | 11/1996 | Kellogg et al. | 701/33.7 |
| 5,950,606 A | 9/1999 | Iida et al. | 123/672 |
| 6,085,732 A * | 7/2000 | Wang et al. | 123/568.12 |
| 6,550,319 B1 * | 4/2003 | Rutkowski et al. | 73/114.32 |
| 6,604,032 B1 | 8/2003 | Möller | 701/29.2 |
| 6,802,302 B1 * | 10/2004 | Li et al. | 123/568.16 |
| 6,820,473 B2 * | 11/2004 | Wagner et al. | 73/114.15 |
| 6,882,929 B2 * | 4/2005 | Liang et al. | 701/115 |
| 6,941,930 B2 * | 9/2005 | Uhl | 123/406.23 |
| 7,124,017 B2 | 10/2006 | Kassner | 701/114 |
| 7,139,657 B2 | 11/2006 | Bouchain et al. | 701/104 |
| 7,200,508 B2 | 4/2007 | Geyer et al. | 702/96 |
| 7,360,408 B2 * | 4/2008 | Dingler et al. | 73/118.01 |
| 7,444,993 B2 * | 11/2008 | Hofmeister | 123/479 |
| 7,493,207 B2 * | 2/2009 | Yasui et al. | 701/103 |
| 7,984,362 B2 * | 7/2011 | Golub et al. | 714/775 |
| 2002/0087258 A1 * | 7/2002 | Johnson | 701/114 |
| 2004/0128054 A1 | 7/2004 | Jaliwala et al. | 701/104 |
| 2004/0204817 A1 * | 10/2004 | Yurgil | 701/114 |
| 2008/0004764 A1 * | 1/2008 | Chinnadurai et al. | 701/29 |
| 2008/0148827 A1 * | 6/2008 | Keski-Hynnila et al. | 73/114.31 |
| 2008/0201061 A1 * | 8/2008 | Fach et al. | 701/103 |
| 2010/0275680 A1 * | 11/2010 | Hofmeister et al. | 73/114.49 |
| 2011/0224888 A1 * | 9/2011 | Girotto et al. | 701/103 |

FOREIGN PATENT DOCUMENTS

| | | | |
|---|---|---|---|
| DE | 10021086 | 11/2001 | F02D 41/20 |
| DE | 10257686 | 7/2004 | F02D 41/38 |
| DE | 10311519 | 9/2004 | F02D 41/00 |
| DE | 102004059364 | 7/2005 | F02D 41/40 |
| EP | 1731743 | 12/2006 | F02D 41/44 |
| JP | 2002505727 A | 2/2002 | F02D 41/22 |
| JP | 2004278542 A | 10/2004 | F02D 41/14 |
| KR | 1019990025998 A | 4/1999 | F02D 43/00 |
| WO | 0163111 | 8/2001 | F02D 41/22 |
| WO | 2004055348 | 7/2004 | F02D 41/22 |

OTHER PUBLICATIONS

International Search Report for Application No. PCT/EP2008/065271 (7 pages), May 8, 2009.

Korean Office Action, Application No. 1020107014149, 3 pages, May 16, 2014.

* cited by examiner

Deviation of the fuel quantity MF

If (measured fuel quantity MF > MF_Max) or (measured fuel quantity MF < MF_Min), then Y(X) = fault value (measured fuel quantity MF-MF_setpoint value) otherwise Y(X) = 0

FIG 2

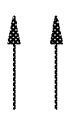

valid setpoint range valid setpoint range min setpoint max

→ MF first and last estimation of the fuel quantity during the method according to the invention

FIG 3 valid setpoint range valid setpoint range min setpoint value max

 

→ MF first estimation of the fuel quantity during the method according to the invention last estimation of the fuel quantity during the method according to the invention

FIG 4 valid setpoint range valid setpoint range min setpoint value max

→ MF first and last estimation of the fuel quantity during the method according to the invention

METHOD AND DEVICE FOR IDENTIFYING ERRORS IN EMISSION-RELEVANT CONTROL DEVICES IN A VEHICLE

CROSS-REFERENCE TO RELATED APPLICATIONS

This application is a U.S. National Stage Application of International Application No. PCT/EP2008/065271 filed Nov. 11, 2008, which designates the United States of America, and claims priority to German Application No. 10 2007 057 311.3 filed Nov. 28, 2007, the contents of which are hereby incorporated by reference in their entirety.

TECHNICAL FIELD

The invention relates to a method and a device for detecting faults in emission-relevant control devices in a vehicle, such as for example the injection of fuel into a cylinder.

BACKGROUND

At emission-relevant automotive control devices diverse methods of detecting faults are carried out for statutory reasons. On the one hand, many methods are a direct legal requirement and in most of these a fault has to be detected and the driver has to be alerted by means of a malfunction indication lamp if a specific emission limit is exceeded. At a data communication interface for the workshop codes, such as for example DTCs (diagnostic trouble codes), for each detected fault are made available in order to facilitate fault diagnosis.

In previous systems, such as are known from the background art, the fault detection of each individual method is independent of the fault detection of the other detection methods. For example, a problem regarding the injection quantity of an individual cylinder is only identified as an emission-relevant fault if this problem alone already results in the emission limit being reached. In other words, it is only when one of the cylinders exceeds the defined emission limit value that a fault is detected. If, however, the problem is less serious in terms of emission deterioration, then no emission-relevant fault is detected and/or communicated to the driver. If in the latter state there are further non-serious faults for example at one or more of the other cylinders, the overall system possibly exceeds emission limits but none of the individual methods detects an emission-relevant fault. In other words, in the situation where none of the individual cylinders exceeds the emission limit value but all of the cylinders combined exceed the emission limit value, this is not detected as a fault.

From DE 102 57 686 A1 moreover a method of adapting an injection characteristic is known. Here, an injection valve characteristic of an activated fuel injection valve that represents a reference injection behavior is adapted to ageing-related changes of an actual injection behavior. Here, during an operating state that requires no fuel injection, the injection valve is intermittently activated. In this case, at least one working cycle with activation precedes a working cycle without activation of the injection valve. In this case, in each case a rotational speed value of the internal combustion engine is detected for the working cycle with activation and at least one such value for the working cycles without activation. The difference of the detected values is then used to carry out a correction of the injection characteristic.

SUMMARY

According to various embodiments, a method and a device can be proposed that allow detection of a fault even when none of the subsystems per se exceeds a defined limit value.

According to an embodiment, a method of detecting faults in a plurality of emission-relevant control devices may comprise the steps: a) determine whether at least one parameter, which allows a conclusion to be drawn about the emission behavior of the respective control device, lies within a setpoint range, b) if the parameter lies outside of the setpoint range, a fault value that correlates with an emission increase is stored, c) if the parameter lies within the setpoint range, a fault value of zero is stored, d) wherein a total fault value is formed from all of the fault values of the control devices, and e) wherein a fault message is output if the total fault value exceeds a defined threshold value.

According to a further embodiment, in the step a) the parameter, if it lies outside of the setpoint range, may be first adapted in at least one adaptation cycle and then it is determined whether the parameter after the adaptation again lies outside of the setpoint range. According to a further embodiment, a fault code may be stored if in step b) it is determined that the parameter lies outside of the setpoint range, wherein the fault code characterizes the respective control device as faulty and/or wherein a fault code is stored if in step c) it is determined that the parameter lies within the setpoint range, wherein the fault code characterizes the respective control device as fault-free. According to a further embodiment, if the total fault value of the control devices reaches or exceeds the threshold value, wherein the threshold value may be for example an emission limit value, the fault codes may remain stored. According to a further embodiment, the emission-relevant control devices can be the cylinders of an engine of a vehicle. According to a further embodiment, as a parameter a fuel quantity that is injected into the respective cylinder can be determined. According to a further embodiment, the fuel quantity in the step a) can be injected with an injection time, wherein the injection time is an injection time for example of a preceding cycle, and then it is determined whether the fuel quantity lies within the setpoint range. According to a further embodiment, in the adaptation cycle the fuel quantity can be adapted at least by adjustment of the injection time and then it is determined afresh whether the fuel quantity lies within or outside of the setpoint range. According to a further embodiment, the fault value that correlates with the emission increase may be a scalar quantity. According to a further embodiment, the fault value may be zero if the fuel quantity lies within the setpoint range and the more the value deviates from the setpoint range the greater it becomes. According to a further embodiment, the total fault value can be the sum of the fault values of the individual control devices.

According to another embodiment, an arrangement for detecting faults in a plurality of emission-relevant control devices may comprise: a device for determining whether or not at least one parameter, which allows a conclusion to be drawn about the emission behavior of the respective control device, lies within a setpoint range, a memory device for storing a fault value, which correlates with an emission increase, if the parameter lies outside of the setpoint range and for storing a fault value of zero if the parameter lies within the setpoint range, and a device for determining a total fault value from all of the fault values of the control devices and for outputting a fault message if the total fault value exceeds a predetermined threshold value.

According to a further embodiment of the arrangement, an adaptation device can be provided, which adapts the parameter if said parameter lies outside of the setpoint range. According to a further embodiment of the arrangement, a memory code device for storing a fault code for the respective control devices can be provided, wherein the memory code device stores "faulty" as a fault code for a control device if the parameter lies outside of the setpoint range, and wherein the memory code device stores a "fault-free" fault code for a control device if the parameter lies within the setpoint range. According to a further embodiment of the arrangement, for example a warning light in a vehicle may flash if the device for determining the total fault value establishes that the total fault value exceeds the predetermined threshold value.

BRIEF DESCRIPTION OF THE DRAWINGS

There now follows a detailed description of various embodiments with reference to the accompanying drawings. These show in.

DETAILED DESCRIPTION

Figure 1:
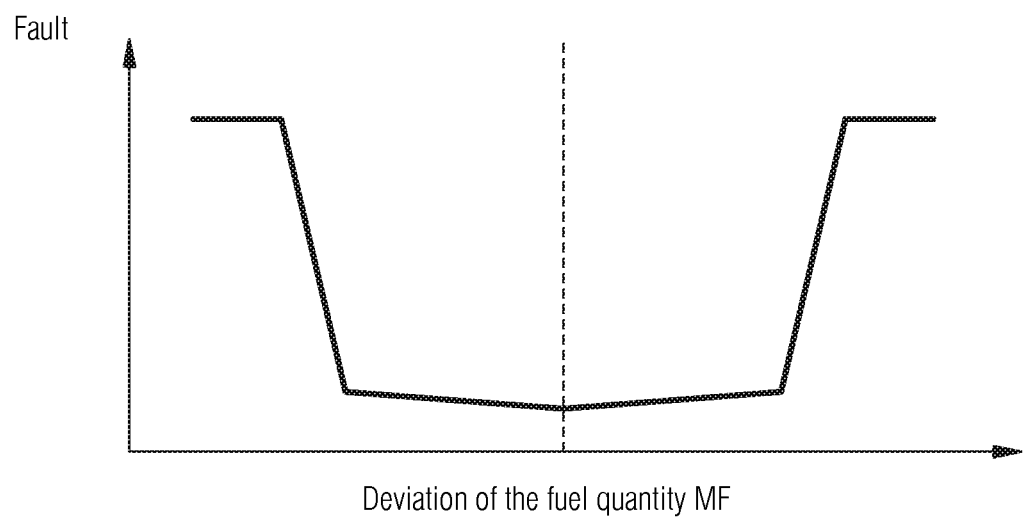
FIG. 1 a graph showing a fault function Y(X) in relation to a deviation of an injected fuel quantity MF (mass fuel) from a setpoint value according to an embodiment, FIG. 2 a diagram of a first case, in which the injection time of a fuel quantity into a cylinder is adapted, FIG. 3 a diagram of a second case, in which the injection time of a fuel quantity into a cylinder is adapted, FIG. 4 a diagram of a third case, in which the injection time of a fuel quantity into a cylinder is adapted, and FIG. 5 a diagram relating to the storage and evaluation of fault values and fault codes of the tested cylinders.

According to various embodiments, it is first determined whether at least one parameter, which directly and/or indirectly allows a conclusion to be drawn about the emission behavior of the respective control device, lies within a setpoint range. If the parameter lies outside of the setpoint range, a fault value that is correlated with an emission increase is stored. If the parameter lies within the setpoint range, on the other hand, zero is stored as a fault value. Subsequently, from all of the individual fault values a total fault value is determined. If this total fault value exceeds a defined threshold value, such as for example an emission limit value, a fault message is output.

This has the advantage that an exceeding of a threshold value is detected even if the individual control devices (subsystems) per se are still not affected by a fault serious enough that they alone already lead to an exceeding of the threshold value. Thus, the exceeding of for example an emission limit value may be detected, indicated to the driver and eliminated very much earlier.

In a further embodiment, in an adaptation cycle it is first tested whether the parameter may be corrected by conventional methods to such an extent that it reaches the setpoint range once more. If after the adaptation cycle the parameter lies once more within the setpoint range, then a fault value of zero is stored. If, however, after the adaptation cycle the parameter lies once more outside of the setpoint range, a fault value other than zero is stored. This has the advantage that a fault message is issued, not as soon as a parameter deviates from the defined setpoint range, but only when this parameter can no longer be corrected by conventional suitable measures. In this case, it is in principle conceivable that more than one, for example two or more adaptation cycles are carried out. If the parameter in the last adaptation cycle again lies outside of the setpoint range, then a corresponding fault value is stored.

In another embodiment, a fault code DTC (diagnostic trouble code) is stored if it is determined that the parameter lies outside of the setpoint range and/or after the adaptation cycle again lies outside of the setpoint range. In this case the fault code indicates that the respective control device is faulty. In addition, a fault code may also be stored if it is determined that the parameter lies within the setpoint range and/or after the adaptation cycle lies once more within the setpoint range, wherein the fault code then characterizes the respective control device as fault-free. Such a fault code DTC has the advantage that it may easily be read out for example in a workshop and supplies a mechanic with exact information about which of the control devices are faulty and which are working properly.

According to another embodiment, the fault codes remain stored if the total fault value of all subsystems reaches or exceeds the threshold value. The deletion of individual faults is suppressed for example until all of the subsystems have been tested. It is only if the total fault value of all of the subsystems lies below the threshold value that individual faults may be selectively deleted. This has the advantage that the quantity of stored data may be limited, namely to the cases where the total fault value for example actually equals or exceeds the threshold value.

In another embodiment, the emission-relevant control devices are the cylinders of a vehicle engine. In this case, the fuel quantity that is injected into the cylinders and burnt has an influence upon the emission behavior of the cylinders. For this reason, as a parameter the fuel quantity that is injected into the respective cylinder is determined and/or estimated. This has the advantage that the fuel quantity is a parameter that is relatively easy to estimate and to influence. The fuel quantity may be estimated for example by means of rotational speed sensors that are already present in a vehicle. However, other suitable sensors or combinations of sensors are in principle also conceivable for determining the fuel quantity.

In a further embodiment, the fuel quantity is first injected with an injection time that has been taken for example from the preceding cycle. It is then determined whether the fuel quantity lies within the setpoint range. This has the advantage that an injection time is used, which is already known and may for example have been optimized in the preceding cycle. This means moreover that the probability of the fuel quantity lying within the setpoint range at the first attempt is higher.

According to a further embodiment, the adaptation cycle is carried out on the basis of an injection time and the fuel quantity. In this case, as a suitable measure the injection time is correspondingly varied, within a setpoint range for the injection time, so that the fuel quantity as a parameter may be influenced in such a way that it is moved closer towards the setpoint range. If the fuel quantity subsequently lies once more within the setpoint range, then a fault value of zero may be stored. If however the fuel quantity lies once more outside of the setpoint range, then first of all there is a fault that cannot be corrected solely by means of the injection time, with the result that a fault value corresponding to the emission increase is defined. The adaptation cycle has the advantage that a fault value greater than zero and a corresponding fault code DTC indicating that the cylinder is faulty are not stored as soon as the fuel quantity deviates from a setpoint value. Instead, first the injection time is correspondingly varied. It is only if this is unsuccessful that the cylinder is assessed as faulty.

In a further embodiment, in the present case the fault value that is correlated with the emission increase is a scalar quantity. This has the advantage of allowing a total fault value and hence an exact emission increase to be determined in a very much more differentiated manner than if the information were restricted exclusively to whether a control device is faulty or fault-free. The fault value in this case is zero, if the fuel quantity lies within the setpoint range, or greater than zero, the more the value deviates from the setpoint range or setpoint value. The total fault value in this case is formed for example by the sum of all of the fault values of the individual control devices.

In FIG. 1 there is first represented a graph showing a fault function Y(X) as a function of a deviation of an injected fuel quantity MF (mass fuel) from a setpoint value.

In accordance with the method according to various embodiments the injected fuel quantity MF is regarded as a parameter for the occurrence of an emission increase, for example in a cylinder. In such a cylinder for example individual faults may occur, which may lead to faulty operating behavior and hence also to an emission increase. For example, over time the injection nozzle of the cylinder ages. In this case, the needle friction as well as the size of the injection nozzle may vary over time. A kind of coking of the injection nozzle and hence a narrowing thereof may moreover occur. Defects in actuating elements of the injection nozzle, for example in piezoelectric elements, may moreover arise.

If one considers the occurrence of faults with regard to a unit of a plurality of cylinders, then during operation variations in the output of the cylinders for example may arise. Furthermore, variations may arise in the fuel pressure sensors and/or FUP sensors and so on. The factors mentioned above are just a few examples of factors that influence the operating performance of cylinders and have a direct or indirect effect also upon the emission behavior.

For this reason, in addition to the fuel quantity MF a large number of further parameters or combinations of parameters that directly or indirectly allow a conclusion to be drawn about an emission increase are in principle conceivable. Such parameters also include parameters that relate for example to exhaust gas recirculation, turbocharging, exhaust gas aftertreatment etc., to name but a few more examples. The absence of pre- and/or post-injections may moreover also be considered as a parameter.

According to various embodiments, with regard to the example of the fuel quantity, first a fuel quantity MF is injected with an injection time TI into a cylinder, wherein as injection time TI for example an injection time TI that was used in the preceding cycle is used. It is then determined and/or in a first estimation estimated whether the fuel quantity MF lies within the setpoint range ($MF_{min}$, $MF_{max}$) or outside of the setpoint range. If the fuel quantity MF deviates from the setpoint range or alternatively from a setpoint value, then an adaptation cycle is started.

In this adaptation cycle the injection time TI is then adapted in accordance with the fuel quantity MF of the first estimation in order to achieve an improved and/or optimum fuel combustion. In this case, the injection time TI is adapted in such a way that the fuel quantity MF as far as possible achieves a defined setpoint value and/or is moved closer to this setpoint value. The fuel quantity MF is then estimated afresh after the injection operation with the new injection time TI. If the fuel quantity MF once again lies outside of the setpoint range and if the injection time TI cannot be adapted to such an extent that an optimum fuel combustion may be achieved because the injection time TI for the estimated fuel quantity that is needed for this purpose exceeds a maximum injection time $TI_{max}$ or is below a minimum injection time $TI_{min}$, then a fault value is determined. This fault value is correlated with a corresponding emission increase. In principle, it is however also conceivable for a plurality of adaptation cycles to be executed before a fault value is stored in the last cycle because the fuel quantity once again lies outside of the setpoint range.

In the present case, FIG. 1 shows a graph representing an example of a fault function Y(X) for determining such a fault value. Here, the fault value is determined as a function of the deviation of the fuel quantity MF from a setpoint value. The deviation of the fuel quantity MF from the setpoint value is in this case an example of an indicator of the emission increase. From the graph it may be gathered that, if the deviation of the fuel quantity from the setpoint value still lies within a setpoint range and/or tolerance range, the fault value zero is set because in this case substantially no emission increase has yet been caused. Furthermore, a so-called fault code DTC is stored, which indicates that the cylinder is fault-free and which may be retrieved later for example in a repair workshop.

If however the deviation of the fuel quantity from the setpoint value lies outside of the setpoint range, then a fault value other than zero and/or greater than zero is set because in this case an emission increase arises at the tested cylinder. The magnitude of the fault value in the present case may be defined for example as a function of the magnitude of the deviation from the setpoint value or the setpoint range. Furthermore, a so-called fault code DTC (diagnostic trouble code) is stored, which indicates that the cylinder is faulty.

In the present case, the determined emission increase at this cylinder need not necessarily be already so great that an emission value reaches or exceeds a critical value, for example the emission limit. The crucial point is that in accordance with the method according to various embodiments it is determined that the cylinder in terms of its injection behavior is contributing towards an emission increase, wherein a correction solely for example by means of an adaptation cycle with the aid of the injection time TI is not possible.

According to various embodiments, subsystems, such as in the present case the cylinders, are considered in this manner.

The subsystems are in turn combined into an overall system, which in the present case comprises for example at least one or more or all of the cylinders of an engine. In this case, the fault codes of the individually considered cylinders and/or of the subsystems are combined and used to determine whether there is a fault with regard to the emission increase in the overall system.

In the following, with reference to FIGS. 2 to 4 three cases are distinguished in the context of the fault analysis according to various embodiments.

In FIG. 2 a diagram of a first case of an injected fuel quantity MF into a cylinder is represented. The diagram shows the setpoint range and a target setpoint value for the fuel quantity MF. The setpoint range is delimited here by a minimum fuel quantity $MF_{min}$ and a maximum fuel quantity $MF_{max}$. First of all, fuel is injected with an injection time TI used for example in the last cycle and the injected fuel quantity MF is estimated in a first estimation. As the estimated fuel quantity MF lies within the setpoint range and has moved closer to the setpoint value, as is evident from FIG. 2, no further adaptation of the injection time TI is necessary because a substantially optimum combustion has already been achieved. The existing injection time TI may be used again in the next cycle, in which the fuel quantity MF is estimated afresh. If this fuel quantity MF again lies within the setpoint range, then there is likewise no need for further adaptation of the injection time TI. If need be, a further adaptation may be effected to move the fuel quantity MF for example even closer to the setpoint value. This however has no influence upon the fault value in this case.

The fault value, which for example correlates with the emission increase, is therefore set at zero because the injection time TI and the associated fuel quantity MF lie within the setpoint range in order to realize an optimum combustion. The contribution of the considered cylinder (subsystem) to the fault sum of all of the considered cylinders (overall system) is therefore zero. Furthermore, a fault-free state is stored as a fault code DTC for this cylinder.

The second case, as represented in FIG. 3, starts in the same way as the first case. First the fuel is injected with an injection time TI used for example in the last cycle and the injected fuel quantity MF is estimated in a first estimation. If the estimated fuel quantity MF deviates from the defined setpoint range, then the injection time TI is correspondingly adapted to the estimated fuel quantity MF in order to achieve a substantially optimum combustion. In the present case the fuel quantity MF in the first estimation lies below the minimum value $MF_{min}$ for the fuel quantity. A corresponding adaptation and/or correction of the injection time TI is therefore effected in order to achieve an optimum combustion. The adapted injection time TI is for example used again in the next cycle and the fuel quantity MF is estimated afresh. The estimated fuel quantity MF in this case again lies within the setpoint range. This means that in the present case an adaptation of the injection time TI as a measure was sufficient to correct the injected fuel quantity MF in such a way that it again falls within the defined setpoint range and a suitable combustion may be guaranteed.

The fault value that correlates with the emission increase is therefore set likewise at zero because an adaptation of the injection time TI is possible in order to realize a substantially optimum combustion. The contribution of the considered cylinder (subsystem) to the fault sum of all of the considered cylinders (overall system) is therefore likewise zero. Furthermore, there is stored as a fault code DTC that the cylinder is fault-free.

FIG. 4 then illustrates a third case. Here, as in the first and second case, first an injection time TI for example of a preceding cycle is used. Then the fuel quantity MF that was injected into the associated cylinder in the injection time TI is estimated. Here, according to FIG. 4 it emerges that the fuel injection quantity MF lies outside of the setpoint range, more precisely below the minimum permissible fuel quantity $MF_{min}$. In this case a corresponding adaptation of the injection time TI is then effected. For the injection time TI there is likewise a permissible setpoint range, i.e. the injection time TI ranges between a minimum injection time $TI_{min}$ and a maximum injection time $TI_{max}$. In the present case, therefore, for the adaptation to the estimated fuel quantity MF an injection time TI that lies within the defined setpoint range for the injection time is used, because the injection time TI cannot be varied and adapted arbitrarily. However, according to FIG. 4 it emerges that this injection time TI alone is insufficient to obtain an optimum combustion. The result of the adapted injection time TI is that the fuel quantity MF, which is subsequently estimated afresh, again lies outside of the setpoint range for the fuel quantity.

As a result of this, the fault value that was correlated with the emission increase is set for example to a value greater than zero. As already described above, the level of the fault value may be selected for example as a function of the extent to which the value for the fuel quantity MF lies outside of the setpoint range or deviates from the target setpoint value.

The reason why the fault value in the present third case, in contrast to the first and second case, is greater than zero is that here it is not possible to realize an optimum combustion by means of an adaptation of the injection time TI alone. Because, in this case too, the fuel quantity MF still lies outside of the setpoint range for the fuel quantity. The contribution of the considered cylinder (subsystem) to the fault sum of all of the considered cylinders (overall system) is therefore greater than zero. Furthermore, there is stored as a fault code DTC for this cylinder that it is faulty.

Alternatively it is also conceivable that, if after the first estimation or—in the case of a plurality of adaptation cycles—during the last estimations of the fuel quantity MF it is determined that a corrective injection time TI assigned for this purpose lies outside of the setpoint range for the injection time TI, a corresponding fault value is directly defined. In this case, a subsequent adaptation cycle is not executed once more to determine whether or not with an adapted injection time TI the fuel quantity MF lies outside of the setpoint range. Instead, as already mentioned, a fault value greater than zero is directly stored. This fault value may then for example be set in relation to the fictitious injection time TI that is needed to bring the fuel quantity MF back into the setpoint range. This fictitious injection time TI in the present case lies outside of the setpoint range for the injection time. The magnitude of the fault value may therefore be defined also as a function of the deviation of the injection time TI from its setpoint range or from a setpoint value.

All of the fault values or only the fault values greater than zero are saved in a memory device of the engine management system for example and are further processed there in order to determine an overall fault. For this purpose, the fault values may for example be summed to form an overall fault in the engine management system. Furthermore, the fault codes DTC are stored for example in a memory code device of the engine management system. A device for determining whether or not parameters, which allow a conclusion to be drawn about the emission behavior of the control devices, deviate from a setpoint range may comprise at least one or more suitable sensors and optionally an evaluation device. In the present case, for example at least one or more rotational speed sensors may be provided, the results of which may be used to determine and/or estimate a fuel quantity MF of a cylinder. The evaluation device for evaluating the results of the sensors may be a separate device or part of the engine management system. The additional adaptation device for carrying out measures to adapt one or more parameters, such as for example the injection time, may likewise be part of the engine management system or be at least controlled by the engine management system.

Figure 5:
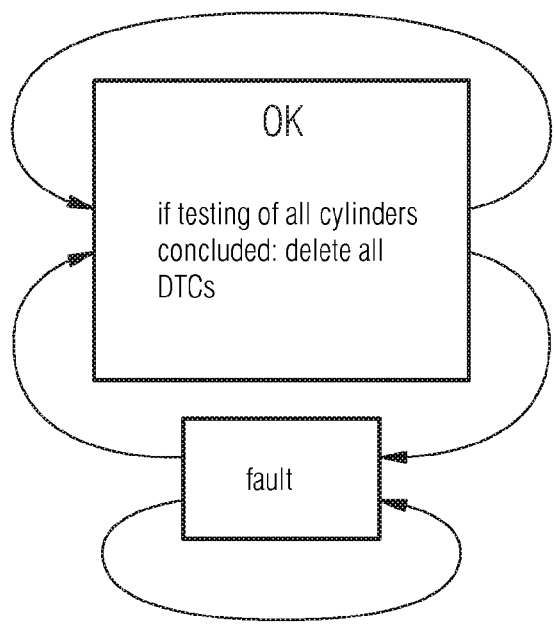

FIG. 5 shows a diagram illustrating the storage of the fault values and the fault codes DTC.

If with regard to the overall system it is determined that all of the considered cylinders (subsystems) have a fault value of zero because the fuel quantity MF either lies from the start within the setpoint range (case 1) or as a result of a corresponding adaptation of the injection time TI lies within the setpoint range (case 2), then an overall fault of zero is calculated. The fault code DTC for the respective cylinders, which are set as fault-free, may accordingly be deleted after all of the cylinders have been tested.

If it is then determined that there are already some cylinders that have a fault value greater than zero because the fuel quantity of these cylinders lies outside of the setpoint range and cannot be corrected by means of the injection time TI alone (case 3), it is checked whether the sum of the fault values is and/or remains less than 1. In this case, the associated fault codes DTC of the previously tested cylinders are initially not deleted. It is only if upon completion of the testing of all of the cylinders and/or subsystems it is determined that the fault value and/or in this case the total fault value is less than 1 that selectively all of the DTC fault codes may be deleted. In this case, the total emission increase of the cylinders (overall system) is still below an emission limit value.

If on the other hand it is determined that the cylinders ultimately have a total fault value of for example 1 or greater than 1, then the fault codes DTC of the individual cylinders are not deleted. Here it should be mentioned that, in contrast to the background art, the emission increase at a cylinder does not have be of such a magnitude that the cylinder on its own already leads to an exceeding of an emission limit value. The system according to various embodiments responds very much earlier, namely when each cylinder still does not exceed an emission limit value but all of the cylinders combined do.

In this case, a message indicating that an emission limit has been exceeded may be issued for example to the driver. For this purpose, for example a corresponding warning light in the vehicle may flash. The driver may then go to a workshop and a mechanic may determine from the stored fault codes DTC which cylinder is working properly and which cylinder is faulty.

At the same time, in the event of such an overall fault it is also possible for example for the pre-injection of all or some of the cylinders to be automatically suppressed by the engine management system in order to prevent an increase of the torque as a result of large pre-injections. Furthermore, a reduction of the torque as a result of the lack of a sufficient fuel quantity may be prevented. Post-injections/regeneration operations may moreover be suppressed in order to prevent too high and/or too low an exhaust gas temperature. These are however merely examples of measures that may be taken in the event that the total fault value is exceeded.

By virtue of the overall-system or subsystem consideration according to various embodiments of all of the fault detection methods it is possible for a fault to be already detected even if each individual fault does not yet lead to an exceeding of emissions. For this purpose, the individual fault detection methods supply, not logic information, such as for example fault "yes" or "no", but a scalar quantity that is correlated with the emission increase in a subsystem. From the sum of all such quantities of the considered overall system or subsystem an exceeding of emissions is reliably detectable without an extreme individual case having to exist.

Because such an overall system fault is unsuitable as information for the workshop, the fault code DTC for each method involved in detection of the emission increase is supplied to a corresponding communication interface. As a result, the same information as before is available in the workshop.

It is moreover necessary to be able to identify an assured fault-free state of a system. For this it is not enough to know from a subsystem that its fault will not on its own lead to an exceeding of emissions. For this reason, according to various embodiments a subsystem is only reported as fault-free if either a) the emission rise caused by this subsystem is zero or b) all of the relevant subsystems have been tested and the total rise lies below the valid threshold value.

The various embodiments allow the detection of a fault in relation to the overall system or subsystem, in contrast to previous methods, in which only the emission influence of individual faults, i.e. faults of lower granularity, is considered.

In accordance with the method according to various embodiments, as already described above, for checking the injection quantity the deviation of the fuel quantity of each cylinder is considered. From each of these possible deviations an influence upon the total emissions of the system is calculated. The sum of all these values is used as a criterion for detection of a fault.

What is claimed is:

1. A method of detecting faults in a plurality of emission-relevant control devices comprising the steps:
   detecting a respective value for each of a plurality of different emission-relevant parameters, each emission-relevant parameter associated with emission behavior of one or more of the plurality of emission-relevant control devices;
   for each one of the emission-relevant parameters:
      comparing the detected value for the respective emission-relevant parameter with a setpoint range associated with that emission-relevant parameter,
      storing a fault value for the the respective emission-relevant parameter based on the results of the comparison, including:
         if it is determined that the detected value for the respective emission-relevant parameter lies outside of the associated setpoint range for that emission-relevant parameter, storing a fault value that correlates with an emission increase, and
         if it is determined that the detected value for the respective emission-relevant parameter lies within the associated setpoint range for that emission-relevant parameter, storing a fault value of zero,
   calculating a total fault value by adding all of the fault values of the plurality of parameters to form a sum, and
   providing a fault message if the total fault value exceeds a defined threshold value.

2. The method according to claim 1, wherein at least one of the plurality of parameters, if it lies outside of the setpoint range, is first adapted in at least one adaptation cycle and then it is determined whether the parameter after the adaptation again lies outside of the setpoint range.

3. The method according to claim 2, wherein the at least one of the plurality of parameters represents a fuel quantity injected into an engine cylinder, and in the at least one adaptation cycle the fuel quantity is adapted at least by adjustment of an associated injection time and then it is determined afresh whether the freshly determined fuel quantity lies within or outside of the setpoint range.

4. The method according to claim 1, wherein a fault code is stored if it is determined that a parameter lies outside of the setpoint range, wherein at least one of: the fault code characterizes the respective control device as faulty and wherein a fault code is stored if it is determined that the parameter lies within the setpoint range, wherein the fault code characterizes the respective control device as fault-free.

5. The method according to claim 4, wherein, if the total fault value reaches or exceeds the threshold value, the fault codes remain stored.

6. The method according to claim 1, wherein the at least one value for a parameter determined includes a fuel quantity that is injected into an associated engine cylinder.

7. The method according to claim 6, wherein the fuel quantity injected has an associated injection time, and the fuel quantity and associated injection time are analyzed to determine whether an injected fuel quantity lies within the setpoint range.

8. The method according to claim 1, wherein the emission-relevant control devices include the cylinders of an engine of a vehicle.

9. The method according to claim 1, wherein the fault value that correlates with the emission increase is a scalar quantity.

10. The method according to claim 1, wherein the fault value is zero if the detected value of the respective parameter lies within the setpoint range and the more the detected value of the respective parameter deviates from the setpoint range the greater the fault value becomes.

11. The method according to claim 1, wherein the defined threshold value is an emission limit value.

12. An arrangement for detecting faults in a plurality of emission-relevant control devices comprising:

a system for detecting a respective value for each of a plurality of different emission-relevant parameters, each parameter associated with emission behavior of one or more of the plurality of emission-relevant control devices;

a processing device and a memory device for determining and storing fault values for each of the plurality of emission-relevant parameters by:

for each one of the emission-relevant parameters:
comparing the detected value for the respective emission-relevant parameter within with a setpoint range associated with that emission-relevant parameter,
storing a fault value, which correlates with an emission increase, if it is determined that the detected value for the respective emission-relevant parameter lies outside of the associated setpoint range for that parameter, and
storing a fault value of zero if it is determined that the detected value for the respective emission-relevant parameter lies within the associated setpoint range for that parameter, and a device for calculating a total fault value by adding all of the fault values of the plurality of emission-relevant control devices to form a sum, and for providing a fault message if the total fault value exceeds a predetermined threshold value.

13. The arrangement according to claim 12, further comprising an adaptation device which adapts the parameter if said detected value of the respective parameter lies outside of the setpoint range.

14. The arrangement according to claim 12, further comprising a memory code device for storing a fault code for the respective control devices, wherein the memory code device stores "faulty" as a fault code for a control device if the parameter lies outside of the setpoint range, and wherein the memory code device stores a "fault-free" fault code for a control device if the parameter lies within the setpoint range.

15. The arrangement according to claim 12, wherein a warning light in a vehicle flashes if the device for determining the total fault value establishes that the total fault value exceeds the predetermined threshold value.

16. A system for detecting faults in a plurality of emission-relevant control devices comprising:
means for detecting a respective value for each of a plurality of different emission-relevant parameters, each parameter associated with emission behavior of one or more of the plurality of emission-relevant control devices;
means for determining and storing fault values for each of the plurality of emission-relevant parameters by:
for each one of the emission-relevant parameters:
comparing the detected value for the respective emission-relevant parameter with a setpoint range associated with that emission-relevant parameter,
storing a fault value that correlates with an emission increase if it is determined that the detected value for the respective emission-relevant parameter that lies outside of the associated setpoint range for that parameter, and
storing a fault value of zero if it is determined the detected value for the respective emission-relevant parameter that lies within the associated setpoint range for that parameter,
means for calculating a total fault value by adding all of the fault values of the plurality of parameters, and
means for providing a fault message if the total fault value exceeds a defined threshold value.

17. The system according to claim 16, further comprising means for storing a fault code if it is determined that the detected value of the respective parameter lies outside of the setpoint range, wherein at least one of applies: the fault code characterizes the respective control device as faulty and wherein a fault code is stored if in step c) it is determined that the parameter lies within the setpoint range, wherein the fault code characterizes the respective control device as fault-free.

18. The system according to claim 17, wherein, if the total fault value of the control devices reaches or exceeds the threshold value, the fault codes remain stored.

19. The system according to claim 16, further comprising means for first adapting the parameter, if it lies outside of the setpoint range, in at least one adaptation cycle and for determining whether the parameter after the adaptation still lies outside of the setpoint range.

* * * * *